United States Patent
Zosin et al.

(10) Patent No.: US 7,337,137 B2
(45) Date of Patent: Feb. 26, 2008

(54) INVESTMENT PORTFOLIO OPTIMIZATION SYSTEM, METHOD AND COMPUTER PROGRAM PRODUCT

(75) Inventors: Leonid Alexander Zosin, Waltham, MA (US); Ananth Madhavan, New York, NY (US)

(73) Assignee: ITG, Inc., New York, NY (US)

( * ) Notice: Subject to any disclaimer, the term of this patent is extended or adjusted under 35 U.S.C. 154(b) by 237 days.

(21) Appl. No.: 10/640,630

(22) Filed: Aug. 14, 2003

(65) Prior Publication Data

US 2004/0181479 A1 Sep. 16, 2004

Related U.S. Application Data

(60) Provisional application No. 60/448,147, filed on Feb. 20, 2003.

(51) Int. Cl.
*G06Q 40/00* (2006.01)

(52) U.S. Cl. ...................... 705/36 R; 705/35
(58) Field of Classification Search ............... 705/35, 705/37, 36 R
See application file for complete search history.

(56) References Cited

U.S. PATENT DOCUMENTS

| | | | |
|---|---|---|---|
| 6,003,018 A | | 12/1999 | Michaud et al. |
| 2002/0184134 A1* | | 12/2002 | Olsen et al. ............ 705/37 |
| 2004/0083150 A1* | | 4/2004 | Michaud et al. |

FOREIGN PATENT DOCUMENTS

EP 1351179 A1 * 7/2003

OTHER PUBLICATIONS

Seow-Eng Ong and Ranasinghe. "Portfolio Variance and Correlation Matrices". Management. Boston: 2000. vol. 6, Issue 1; p. 1, 6 pgs.*
R. E. Bailey, "Economics of Financial Markets," pp. 75-98, 2002.
Best, M. J. et al., "On The Sensitivity Of Mean-Variance-Efficient Portfolios To Changes In Asset Means: Some Analytical And Computational Results," The Review of Financial Studies, 4(2), pp. 315-342, 1991.
Chopra, V. K., "Improving Optimization," The Journal of Investing, pp. 51-59, Fall 1993.
Chopra V. K. et al., "The Effect Of Errors In Means, Variances, And Covariances On Optimal Portfolio Choice," pp. 6-11, Winter 1993.

(Continued)

*Primary Examiner*—Lalita M Hamilton
(74) *Attorney, Agent, or Firm*—Rothwell, Figg, Ernst & Manbeck

(57) ABSTRACT

The preferred embodiments provide improved systems, methods and products for the optimization of a portfolio and/or multi-portfolios of assets, such as stocks. In some preferred embodiments, new methodology can be employed wherein a confidence region for a mean-varience efficiency set is utilized. In some preferred embodiments, new methodology can be employed for improved computation of a reward-to-variability ratio or Sharpe Ratio. In some preferred embodiments, new methodology can be employed for multiportfolio optimization. In some preferred embodiments, a portfolio optimization engine or module can be adapted to implement one or more of these new methodologies, along with any other desired methodologies.

8 Claims, 7 Drawing Sheets

OTHER PUBLICATIONS

FinPortfolio.com—"Tutorial Asset Allocation," pp. 1-3, Copyright 1999-2001.
FinPortfolio.com—"Tutorial Efficient Frontier," p. 1-2, Copyright 1999-2001.
ILOG Optimization Suite, "Powering Your Decisions," pp. 1-6, Jun. 2002.
Kallberg, J. G. et al., "Mis-Specifications In Portfolio Selection Problems," Lecture Notes In Economics And Mathematical Systems, 227, pp. 74-87, 1984.
Sharpe, W. F., "The Sharpe Ratio," pp. 1-16, Fall 1994.

* cited by examiner

INVESTMENT PORTFOLIO OPTIMIZATION SYSTEM, METHOD AND COMPUTER PROGRAM PRODUCT

BACKGROUND OF THE INVENTION

1. Field of the Invention

The preferred embodiments of present invention relate to, among other things, methods for selecting one or more portfolio of tangible or intangible assets subject to optimization. The preferred embodiments provide a portfolio optimizer that enables investment managers to construct portfolios to meet targeted objectives.

2. Discussion of the Background

Managers of assets, such as portfolios of stocks and/or other assets, often seek to maximize returns on an overall investment, such as, e.g., for a given level of risk as defined in terms of variance of return, either historically or as adjusted using known portfolio management techniques.

Following the seminal work of Harry Markowitz in 1952, mean-variance optimization has been a common tool for portfolio selection. A mean-variance efficient porfolio can be constructed through an optimizer with inputs from an appropriate risk model and an alpha model. Such a portfolio helps ensure higher possible expected returns (e.g., net of taxes and subject to various constraints) for a given level of risk.

Risk lies at the heart of modern portfolio theory. The standard deviation (e.g., variance) of an asset's rate of return is often used to measure the risk associated with holding the asset. However, there can be other suitable or more suitable measures of an asset's risk than its standard deviation of return. A common definition of risk is the dispersion or volatility of returns for a single asset or porfolio, usually measured by standard deviation. With reference to U.S. Provisional Application Ser. No. 60/418,727 filed on Oct. 17, 2002, the disclosure of which is incorporated herein by reference in its entirety, ITG, Inc., the assignee of the present invention has developed a set of risk models for porfolio managers and traders to measure, analyze and manage risk in a rapidly changing market. These models can be used to, among other things, create mean-variance efficient portfolios in combination with a portfolio optimizer, such as, e.g., those set forth herein.

According to modern portfolio theory, for any portfolio of assets (such as, e.g., stocks and/or other assets) there is an efficient frontier, which represents variously weighted combinations of the portfolio's assets that yield the maximum possible expected return at any given level of portfolio risk.

In addition, a ratio of return to volatility that can be useful in comparing two portfolios in terms of risk-adjusted return is the Sharpe Ratio. This ratio was developed by Nobel Laureate William Sharpe. Typically, a higher Sharpe Ratio value is preferred. A high Sharpe ratio implies that a portfolio or asset (e.g., stock) is achieving good returns for each unit of risk. The Sharpe Ratio can be used to compare different assets or different portfolios. Often, it has been calculated by first subtracting the risk free rate from the return of the portfolio, and then dividing by the standard deviation of the portfolio. The historical average return of an asset or portfolio can be extremely misleading, and should not be considered alone when selecting assets or comparing the performance of portfolios. The Sharpe Ratio can allows one to factor in the potential impact of return volatility on expected return, and to objectively compare assets or portfolios that may vary widely in terms of returns.

By connecting a portfolio to a single risk factor, Sharpe simplified Markowitz's work. Sharpe developed a heretical notion of investment risk and reward—a sophisticated reasoning that has become known as the Capital Asset Pricing Model (CAPM). According to the CAPM, every investment carries two distinct risks. One is the risk of being in the market, which Sharpe called systematic risk. This risk, later dubbed "beta," cannot be diversified away. The other risk, unsystematic risk, is specific to a company's fortunes. This uncertainty can be mitigated through appropriate diversification. Sharpe discerned that a portfolio's expected return hinges solely on its beta—its relationship to the overall market. The CAPM helps measure portfolio risk and the return an investor can expect for taking that risk.

Portfolio optimization often involves the process of analyzing a portfolio and managing the assets within it. Typically, this is done to obtain the highest return given a particular level of risk. Portfolio optimization can be conducted on a regular, periodic basis, such as, e.g., monthly, quarterly, semi-annually or annually might be sufficient. However, since one is not required to rebalance a portfolio each time one optimizes, one can optimize as frequently as desired. In considering rebalancing decisions, one typically also considers tax and/or transaction cost implications of selling some assets and buying other asssets as one pursues an optimal portfolio.

In some existing portfolio optimizers, techniques such as hill climbing or linear/quadratic programming are used to seek an optimal solution. With these systems, issues like long/short, minimum position size or position count constraints, tax costs and transaction costs generally cannot be modeled accurately using these techniques. In addition, U.S. Pat. No. 6,003,018, entitled Portfolio Optimization By Means Of Resampled Efficient Frontiers, the entire disclosure of which is incorporated herein by reference shows other optimizer methods. The present invention provides substantial improvement over these and other optimizers.

The present assignee has developed a portfolio optimizer, the ITG/Opt™ optimizer, that uses mixed integer programming (MIP) technology to produce more accurate results. The ITG/Opt™ optimizer provides enhanced results when, e.g., creating or rebalancing portfolios. The ITG/Opt optimizer performs optimization in one pass, with all constraints and parameters taken into account simultaneously. Any security characteristic can be constrained or introduced. In addition, a full range of portfolio characteristics may also be specified, including constraints on leverage, turnover, long vs. short positions, and more. Furthermore, constraints may be applied to an entire portfolio or to its long or short sides alone. Furthermore, the ITG/Opt avoids misleading heuristics by combining a branch-and-bound algorithm with objective scoring of potential solutions, reducing the size of the problem without damaging the integrity of the outcome.

Additionally, the ITG/Opt optimizer can accurately model the tax code. For example, integer modeling of tax brackets and tax lots enables the ITG/Opt optimizer to minimize net tax liability without discarding large blocks of profitable shares. The ITG/Opt is also adaptable to HIFO, LIFO, or FIFO accounting methods. In addition, the ITG/Opt is configured toward real-world complexities of sophisticated investment strategies. The ITG/Opt optimizer can handle complex and/or non-linear issues that arise in real-world fund management.

Additionally, the ITG/Opt optimizer can factor transaction costs resulting from market impact into its solutions. The optimizer includes a cost model, ACE™, for forecasting market impact. The inclusion of ACE enables users to weigh implicit transaction costs along with risks and expected returns of optimization scenarios.

Additionally, the ITG/Opt does effective historical backtesting. The ITG/Opt can closely track portfolios through time, accounting for the effects of splits, dividends, mergers, spinoffs, bankruptcies and name changes as they occur.

Additionally, the ITG/Opt is equipped to handle many funds and many users. The ITG/Opt system includes multiuser, client-server relational database management technology having the infrastructure to accommodate the demands of many simultaneous users and a large volume of transactions.

Additionally, the ITG/Opt integrates neatly with trade-order management and accounting systems. Because the ITG/Opt system is built on relational database management technology it is easy to link with other databases. The ITG/Opt can also generate trade lists for execution by proprietary TOM systems. Moreover, ITG/Opt's flexible design allows for extensive customization of reports to fit a companyies' operations and clients' needs. Moreover, custom report formats can be designed quickly and cost-effectively.

While a variety of portfolio optimization systems and methods may exist, there is a significant need in the art for systems and processes that improve upon the above and/or other systems and processes.

SUMMARY OF THE PREFERRED EMBODIMENTS

The various preferred embodiments of the present invention significantly improve upon existing systems and methods.

The preferred embodiments provide improved systems, methods and/or products for the optimization of a portfolio and/or multi-portfolios of assets, such as stocks. In some preferred embodiments, new methodology can be employed wherein a confidence region for a mean-varience efficiency set is utilized. In some preferred embodiments, new methodology can be employed for improved computation of a reward-to-variability ratio or Sharpe Ratio. In some preferred embodiments, new methodology can be employed for multiportfolio optimization. In some preferred embodiments, a portfolio optimization engine or module can be adapted to implement one or more of these new methodologies, along with any other desired methodologies.

In some illustrative embodiments, a method for optimizing a porfolio of assets includes: a) inputting portfolio data into an optimization engine, said optimization engine having a confidence region module; b) having said optimization engine generate optimization results via said confidence region module and outputting said results, wherein said confidence region module defines a confidence region for a mean-variance efficient set for a porfolio $P_o$ on an efficient frontier that corresponds to a risk aversion γ; and c) rebalancing a portfolio based on said optimization results. Preferably, the region includes all porfolios P, such that: $c_{low}*Risk(P_0)<Risk(P)<c_{high}*Risk(P_0)$ and $Ret(P)>c*Ret(P_{opt})$, where $P_{opt}$ is a portfolio on the efficient frontier such that $Risk(P_{Opt})=Risk(P)$ and $c_{low}$, $c_{high}$ and c are relative average deviations of decrease in risk, increase in risk and expected return of optimal portfolios that correspond to the risk aversion y and different vectors of returns. Preferably, a user sets a specific confidence level by setting different values for constants $c_{low}$, $c_{high}$ and c.

According to some other illustrative embodiments, a method for optimizing a porfolio of assets includes: a) inputting portfolio data into an optimization engine, said optimization engine having a compute Sharpe Ratio module; b) having said optimization engine generate optimization results and outputting said results, wherein said compute a Sharpe Ratio module computes a Sharpe Ratio using 1) a find bounds algorithm which starts with a maximum value of adjusted return, the adjusted return is decreased by a factor at steps of the algorithm, and the algorithm terminates when a best value of Sharpe Ratio, that corresponds to a current level of the adjusted return, is lower than a Sharpe Ratio at a previous iteration and using 2) a find Sharpe Ratio algorithm in which at iterations a guess of the maximum Sharpe Ratio value S is updated; and c) rebalancing a portfolio based on said optimization results. Preferably, the compute Sharpe Ratio module outputs an optimal value of a Sharpe Ratio and a portfolio that achieves that ratio. Preferably, to decrease computation time, optimization is started in each iteration from an optimal solution obtained in a previous iteration.

According to some preferred embodiments, a method for multi-portfolio optimization includes: a) inputting multi-portfolio data into an optimization engine, said optimization engine having a multi-portfolio optimization module; b) having said optimization engine generate optimization results via said multi-portfoilio optimization module and outputting said results, wherein said multi-portfolio optimization module performs an algorithm for multi-portfolio optimization that computes the optimal set of porfolios $h_1, \ldots, h_K$, that minimizes the value of the maximum relative or absolute distance of the value of a function $\Omega_k(h_k)$ from a value $\Omega_k(h_k^{Opt})$, where maximum is taken over all portfolios $h_1, \ldots, h_K$, and wherein the set also satisfies a constraint on a total portfolio the problem with shorty is he always gone $\Sigma_{k=1,K}h_k$; and c) rebalancing a portfolio based on said optimization results.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or vanous other embodiments, wherein.

DETAILED DESCRIPTION OF THE PREFERRED EMBODIMENTS

The preferred embodiments of the invention can be implemented on one or more computer(s) and/or one or more network of computer(s), such as a local area network (LAN), a wide area network (WAN), the Internet and/or another network. In various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. Client computers may contain, in some embodiments, browser software for interacting with the server(s), such as, for example, using hypertext transfer protocol (HTTP) to make requests of the server(s) via the Internet or the like.

Figure 4:
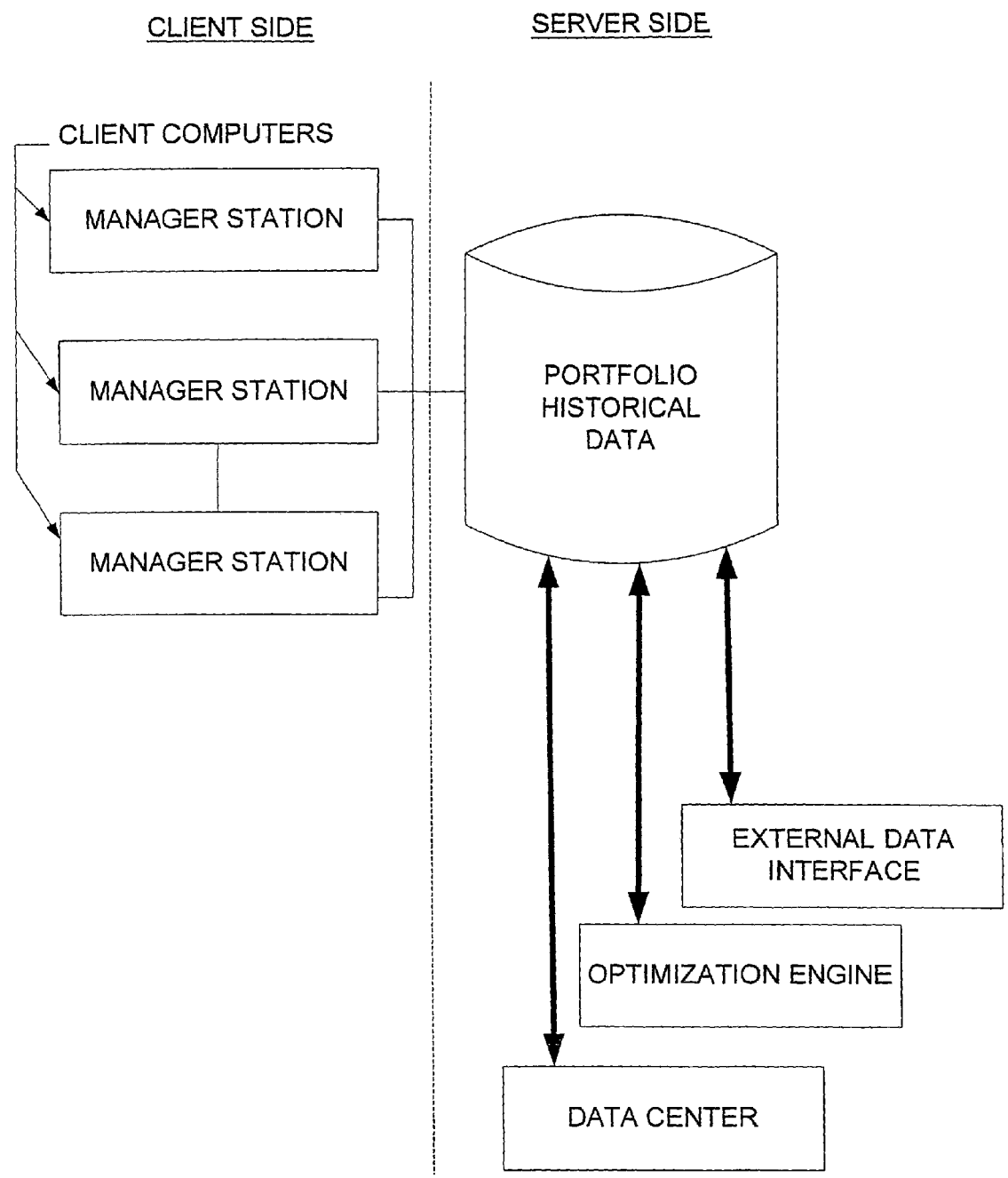
FIG. 4 illustrates computer system(s) that can be used to, among other things, implement process steps in various embodiments of the invention.

In some preferred embodiments, the system utilizes relational databases, such as, e.g., employing a relational database management system (RDBMS) program to create, update and/or administer a relational database. The RDBMS may take Structured Query Language (SQL) statements entered by a user or contained in an application program and create, updates and/or provides access to database(s). Some illustrative RDBMS's include ORACLE's database product line and IBM's DB2 product line. In some illustrative embodiments, as shown in FIG. 4, one or more client computer can be provided, such as, e.g., a LAN-based system. The client computer(s) can include an appropriate operating system, such as, for example, WINDOWS NT or another system. In preferred embodiments, the system is adapted to provide an object based graphical user interface (GUI).

In some preferred embodiments, the system provides a multi-user client server system, such as shown in FIG. 4. In some embodiments, the system provides a hierarchical, object-based portfolio control structure for managing variants of a core set of strategies. In some embodiments, data based can include holdings, trades, prices, corporate actions and others. In some preferred embodiments, multiple risk models may be employed, such as, e.g., BARRA, NORTHFIELD, custom models and others.

In some preferred embodiments, porfolios are composed of data objects, such as, e.g., holdings, historical executions, universe, benchmark, risk model, market data and/or others. In preferred embodiments, a universe of selected stocks can include, e.g., all of the relatively active securities in a relevant market or the like. Assuming, for example, that the U.S. market is the relevant market, then the universe of selected stocks may comprise, in some embodiments, approximately 8,000 stocks, including stocks from the New York Stock Exchange, the American Stock Exchange, the NASDAQ National Market, and some small cap stocks. Preferably, the specific objects in a porfolio can be defined by attributes and/or parameters that are set by a user. In some preferred embodiments, an instance of a porfolio can be generated on the basis of an analysis date attribute, such as, in one illustrative example: a 3% S&P tracking portfolio with a Russell 1000 universe as of Jan. 1, 2003.

Figure 5:
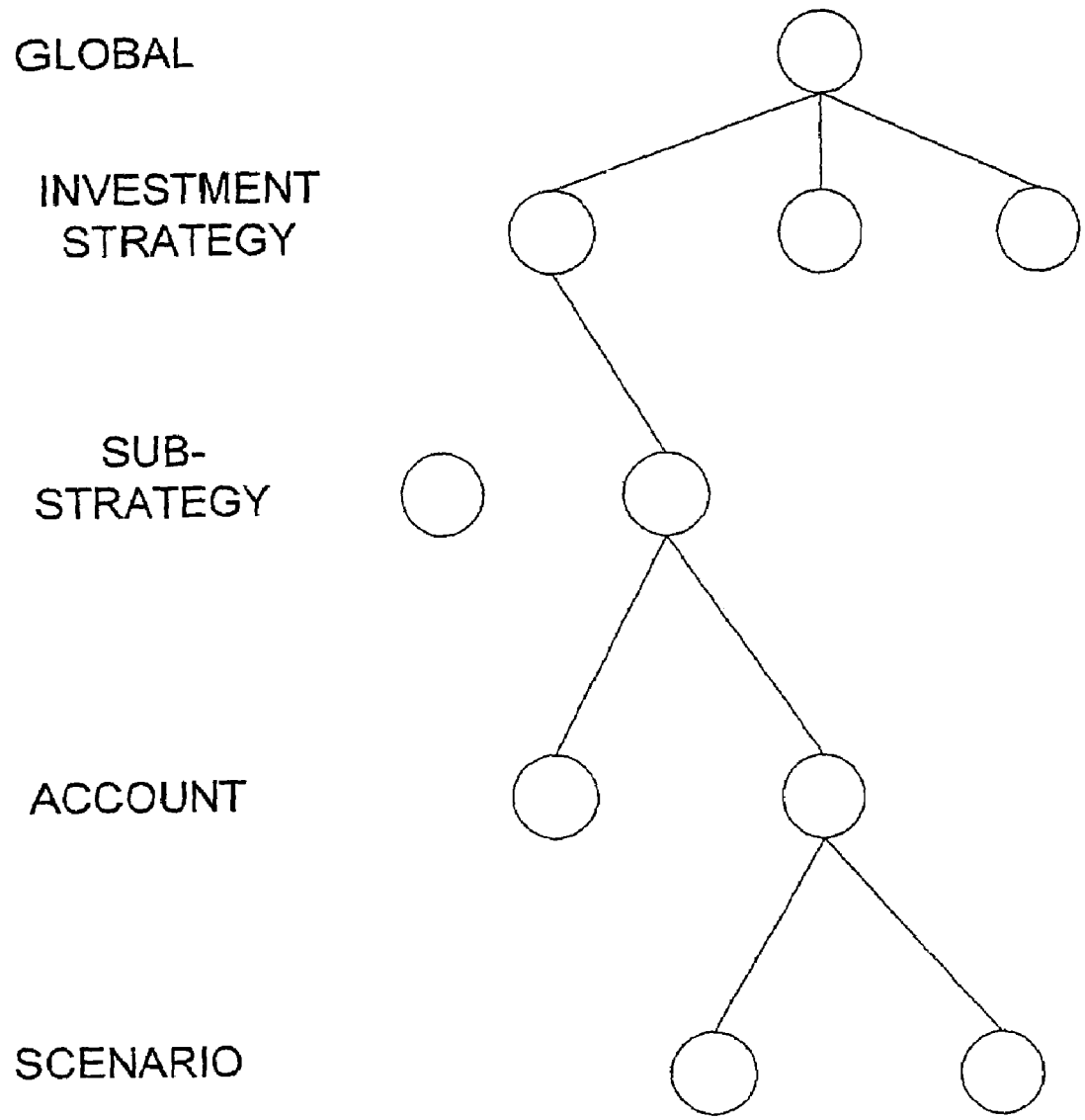
FIG. 5 is a schematic diagram illustrating database management structure according to some preferred embodiments.
Figure 6:
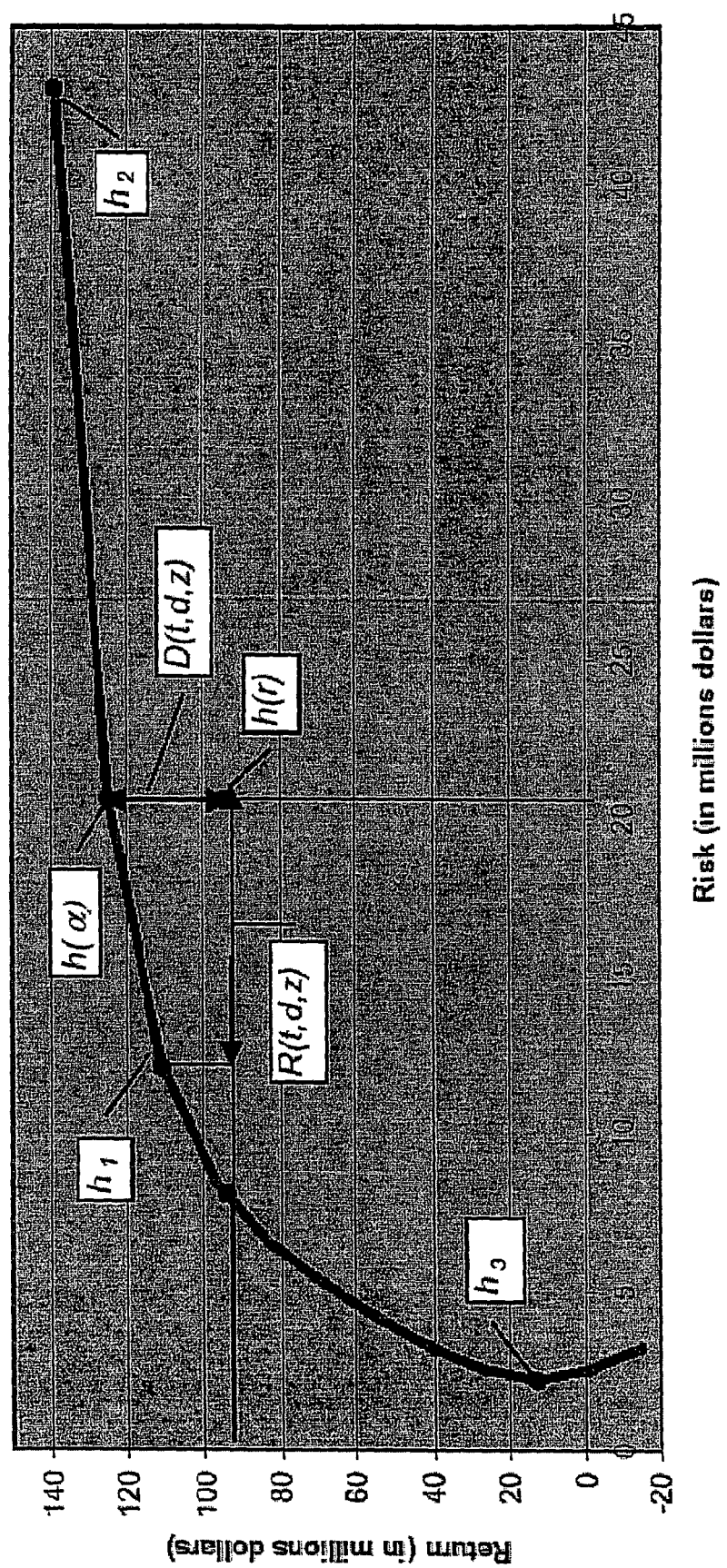
FIG. 6 is an illustrative graph of return (e.g., in milliions of dollars) verses risk (e.g., in millions of dollars) for, e.g., finding an optimal portfolio.
Figure 7:
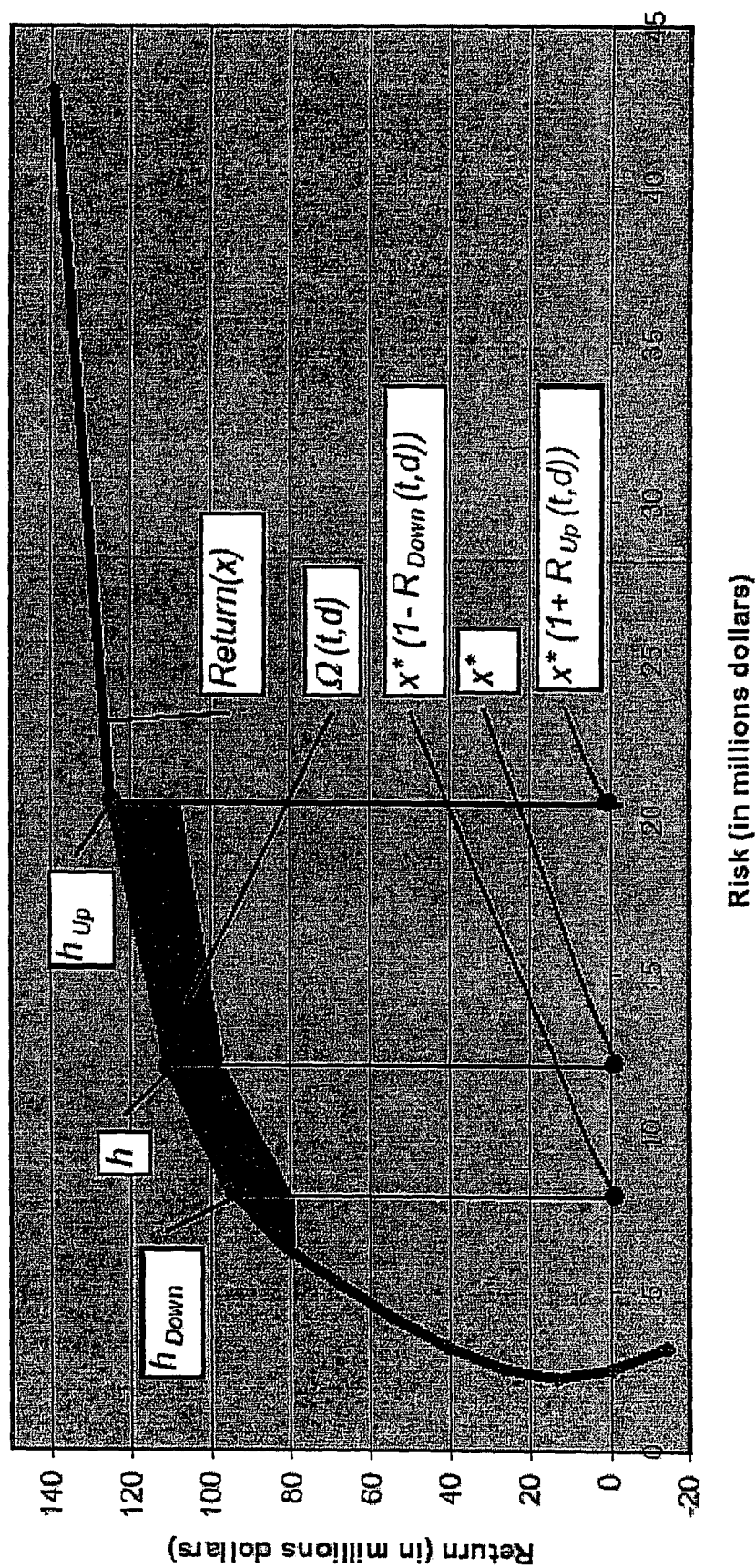
FIG. 7 is an illustrative graph of return (e.g., in milliions of dollars) verses risk (e.g., in millions of dollars) showing, e.g., a set of mean-variance points that deviate from the mean-variance efficient frontier according to some illustrative embodiments of the invention.

In some preferred embodiments, the portfolio database can have an attributes hierarchy, such as, for example, a five level hierarchy as illustratively shown in FIG. 5. In some illustrative embodiments, the lower levels may inherit attributes of higher levels. Additionally, the lower levels can preferably override inherited attributes. In some preferred embodiments, the portfolio database can have characteristics that can be, e.g., arbitrary stock specific data. Preferably, users can define characteristics, such as using formulas and/or rules to create new characteristics from other characteristics. As some illustrative examples, a user could use algebraic creation methods, such as, e.g., "A=B+C×D." As some illustrative examples, a user could use set membership methods, such as, e.g., "A+1 if B<C and B>D." In some preferred embodiments, filters can be provided to enable names to be removed from a universe for compliance and/or other reasons, such as, e.g., "remove sin stocks with p/e's>10 and price<5." In some preferred embodiments, the system can provide default values for characteristics that are not specified.

In some preferred embodiments, users can construct customized reports, such as, e.g., customized asset level reports. Preferably, report definitions can be named and stored (e.g., in digital data storage).

In some preferrred embodiments, any dimension of a portfolio "space" can be part of an objective function or constraint. In preferred embodiments, the system can facilitate the exploring of tradeoffs between any combination of, for example: expected return; risk/tracking; exposures; transaction costs; taxes; position/trade counts/sizes; and others.

In some preferred embodiments, the system provides one optimization with one universe in which both sides (e.g., buy and sell sides) are rebalanced subject to constraints on each side individually and for the portfolio as a whole.

In some preferred embodiments, users are provided with a graphical user interface that is presented to the users via client computers. In some embodiments, the graphical user interface enables the importing and/or exporting of data and files, the setting of parameters, the running of the optimization and/or the acceptance of optimization results. In some embodiments, users can create or import specific task schedules in which, for example, import and/or export of data can be automated and functionality available in the user interface is available in batch processing.

Figure 1:
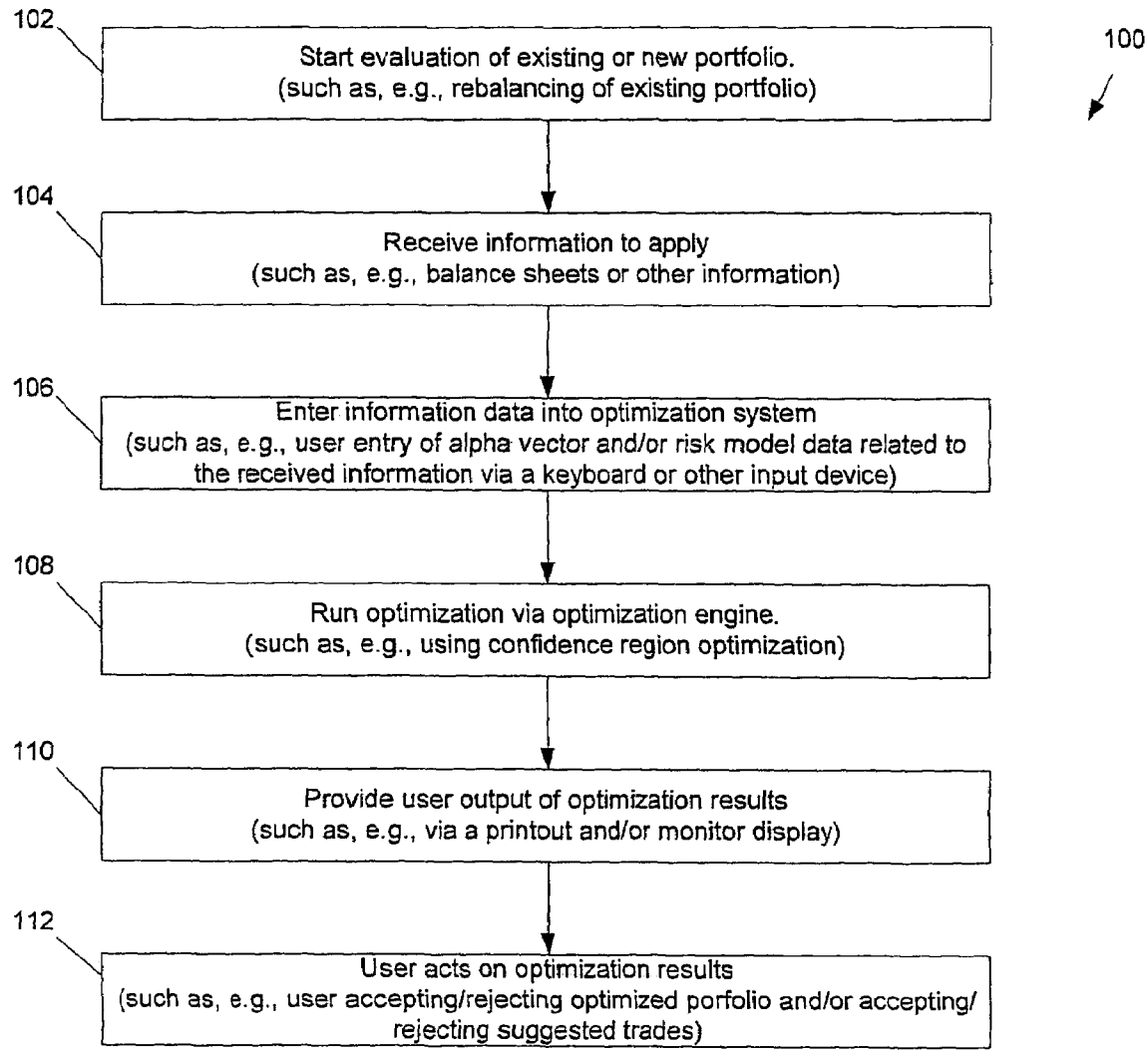
FIG. 1 is a flow diagram illustrating a process according to some embodiments of the invention.
Figure 2:
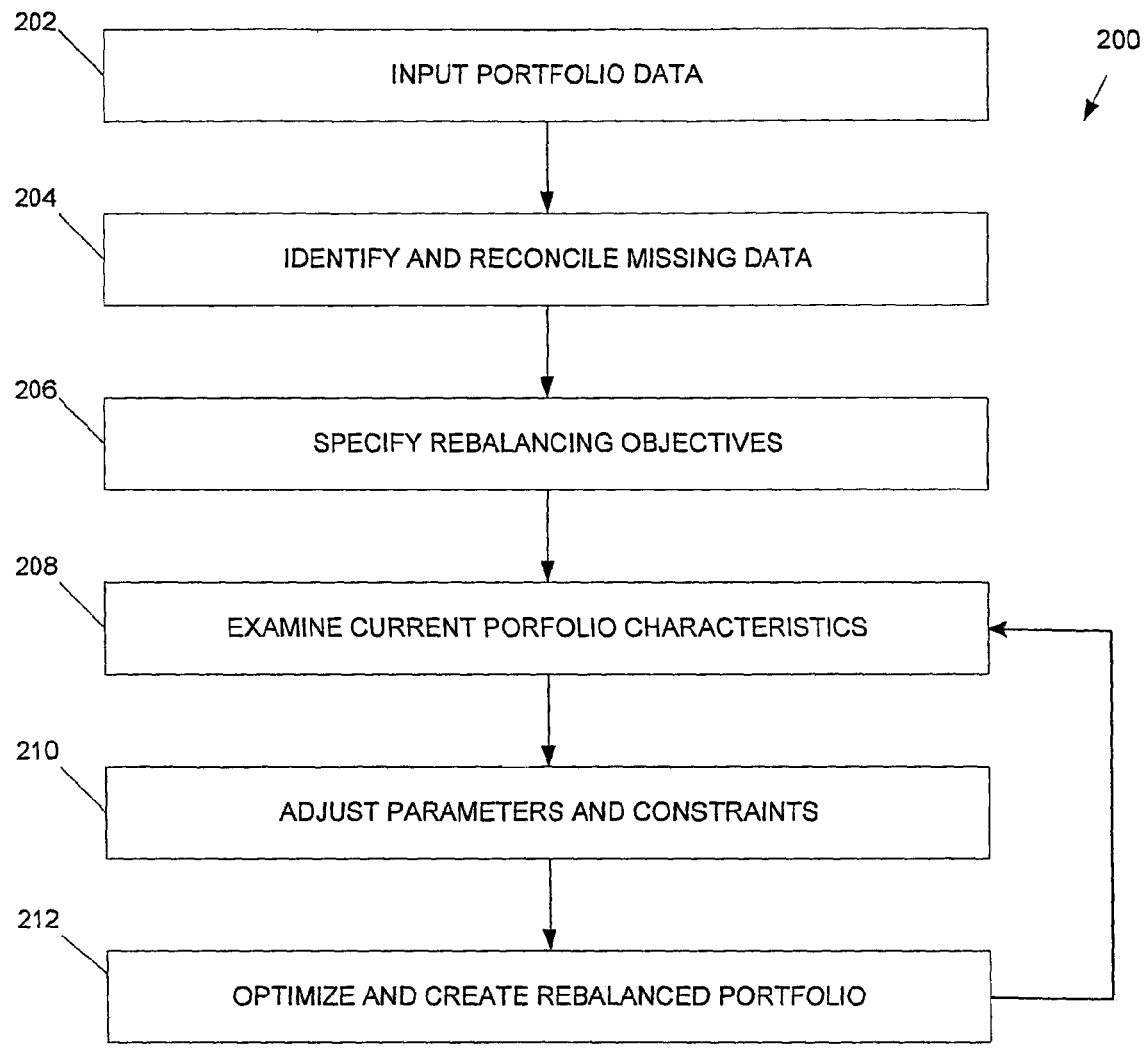
FIG. 2 is another flow diagram illustrating a process according to some embodiments of the invention.
Figure 3:
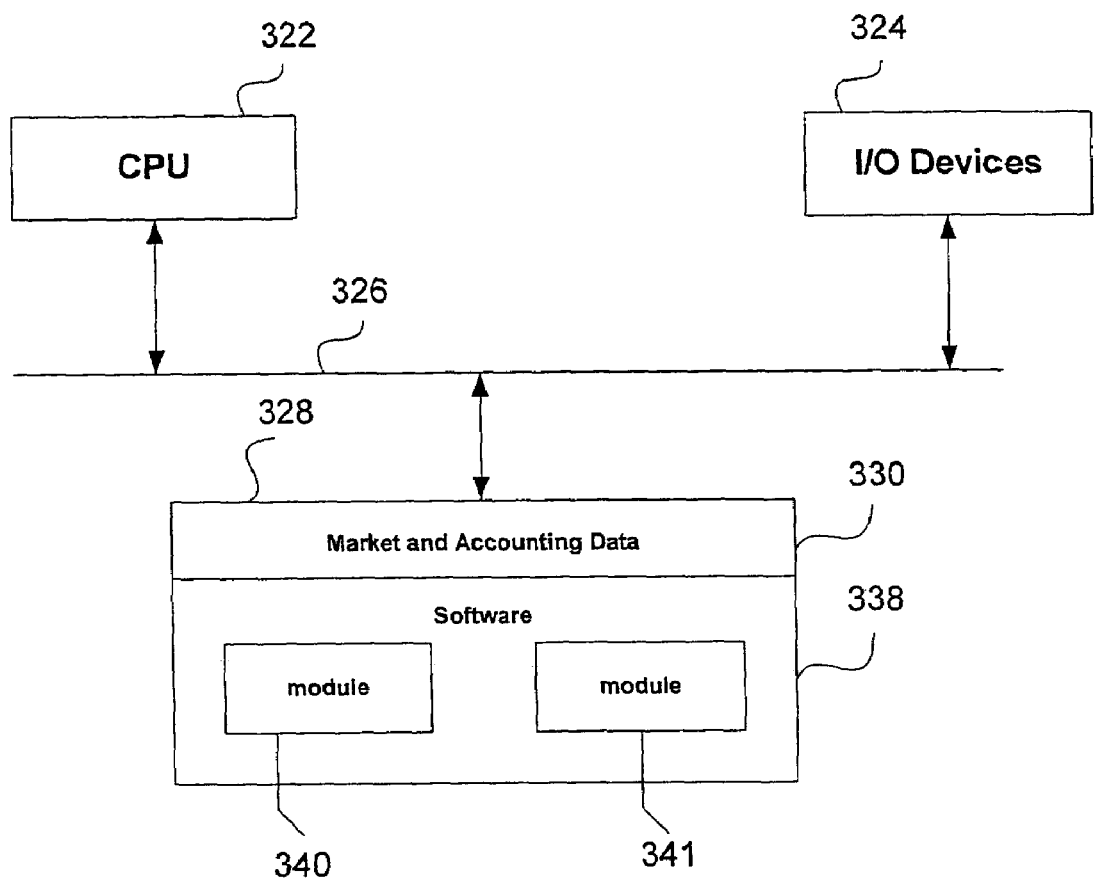
FIG. 3 illustrates computer(s) that can be used to, among other things, implement process steps in various embodiments of the invention.

FIG. 3 shows an illustrative computer 320 that can be used to implement computerized process steps, such as, e.g., within processes 100 and 200 shown in FIGS. 1 and 2. In some embodiments, the computer 320 includes a central processing unit (CPU) 322, which can communicate with a set of input/output (I/O) device(s) 324 over a bus 326. The I/O devices 324 can include, for example, a keyboard, mouse, video monitor, printer, and/or other devices.

The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art.

Memory 328 can include, for example, market and accounting data 330, which can include, for example, data on stocks, such as, e.g., stock prices, and data on corporations, such as, e.g., book value. The memory 328 can also store software 338. The software 338 can include a number of modules 340 for implementing the steps of processes, such as computer implemented steps of the processes 100 and/or 200 shown in FIGS. 1 and 2. Conventional programming techniques may be used to implement these modules. Memory 328 can also store the above and/or other data file(s).

In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. The medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

FIGS. 1 and 2 illustate process steps that may be carried out in some illustrative embodiments of the invention. These two processes are illustrative and various embodiments of the invention can be applied in various processes. With respect to the illustrative process 100 shown in FIG. 1, in a first step 102, the process initiates the evaluation of an existing or new portfolio. Then, in a second step 104, the system receives information to apply into the optimization analysis. Then, in a third step 106, information is entered into an optimization system, such as an optimization engine. Then, in a forth step 108, optimization algorithms and methodologies are executed via an optimization engine. Then, in a fifth step 110, optimization results are provided to a user. Then, in a sixth step 112, the user acts on the optimization results. For example, the user might, e.g., rebalance a portfolio based on the results.

With respect to the illustrative process 200 shown in FIG. 2, in a first step 202, a user can input portfolio data. In some preferred embodiments, a user can create a portfolio with a portfolio name editor. Preferably, the user can load data as needed using file import/export utilities, such as, e.g.: identifier map; holdings, benchmarks, universes, characteristics, risk models and/or others. Preferably, a user can also define portfolio attributes with a parameter editor, such as, e.g.: analysis date; benchmark; universe; characteristics; risk model. Preferably, a user can also scrub data.

Then, at step 204, a user can identify and reconsile missing data. In some preferred embodiments, a user can reconcile data from multiple sources. In some embodiments, some potential problems could include: changes in asset status or identifier; missing or erroneous characteristics or risk data; membership in benchmark or universe; and/or others. In some embodiments, a holdings summary report can provide high-level problem notification. In some embodiments, missing data reports can be used for: holdings; benchmark; universe; characteristics; factor exposures; and/or others. In some embodiments, a user can use data editors to fix problems.

Then, at a step 206, a user can specify rebalancing objectives. In some preferred embodiments, a user can select "standard" parameters using a parameter editor, such as, for example: cash flow; objective function (e.g., alpha, risk aversion); risk constraints (e.g., two or plural benchmarks, common factor and specific); cash balance, turnover constrainst; position size, position count and/or trade size constraints; universe characteristics filter; and/or others. Preferably, a user can select user specific parameters. Preferably, a user can construct a constraint matrix using row/column bounds editors.

Then, at a step 208, a user can examine current porfolio characteristics. In some embodiments, a user can receive reports for one or more of: holdings; universe; benchmark; final portfolio; and/or others. Preferably, a user can receive summary and detail related to: accounting; characteristics; factor exposure; trades; and/or others.

Then, at a step 210, a user can adjust parameters and constraints. In some preferred embodiments, a user can perform this step via a parameter editor. Preferably, a row/column bounds editor is provided.

Then, at a step 212, a user can optimize and create a rebalanced portfolio. This step can utilize an optimization engine to optimize and create suggested portfolios/trades. Preferably, the user can then examine the suggested portfolio/trades via, for example, a trade summary report, a trade detail report or the like. The user can then preferably edit the suggested porfolio/trades as needed. The user can then preferably incorporate suggested portfolios/trades into particular executions.

As shown by arrow A2, the user can repeat steps 208-212 as desired to continuously evaluate portfolios/trades, rebalance portfolios and the like. In some preferred embodiments of the invention, step 108 in the process shown in FIG. 1 and/or step 212 in the process shown in FIG. 2 can include optimization methodologies as described below. In order to implement these methodologies, in preferred embodiments an optimizer (created, e.g., via software or the like) can include software modules or the like that effect steps as set forth below.

Preferred Confidence Region Optimization Embodiments

In some preferred embodiments of the invention, a portfolio optimizer can be provided that enables one to ascertain an acceptable region of error. This can be advantageous, e.g., to help avoid having an optimizer that might propose changes or trades to be made as a result of "noise" within various inputs, which could, potentially, result in numerous trades and various costs related thereto. In some preferred embodiments of the present invention, with an understanding of approximately how noisy these inputs are, the system can discern how large a region a portfolio manager can remain within that is deemed to be acceptable.

In some preferred embodiments, the optimizer can define a confidence region for a portfolio $P_0$ on the efficient frontier that corresponds to a risk aversion $\gamma$. In preferred embodiments, this region includes all portfolios P, such that $c_{low}*\text{Risk}(P_0)<\text{Risk}(P)<c_{high}*\text{Risk}(P_0)$ and $\text{Ret}(P)>c*\text{Ret}(P_{opt})$. Where $P_{Opt}$ is a portfolio on the efficient frontier such that $\text{Risk}(P_{Opt})=\text{Risk}(P)$. Additionally, $c_{low}$, $c_{high}$ and c are relative average deviations of decrease in risk, increase in risk and expected return of optimal portfolios that correspond to the risk aversion $\gamma$ and different vectors of returns. It can be assumed that vectors of returns are normally distributed around their mean. In preferred embodiments, a user is able to set a specific confidence level by setting different values for constants $c_{low}$, $c_{high}$ and c.

In the resampled efficient portfolio optimization of the '018 patent, discussed above, a confidence region is computed around a resampled efficient frontier portfolio $P_0$ and includes all portfolios with a value of variance relative to $P_0$ less than or equal to a value associated with a specified confidence level. There, a main point in the resampled efficient portfolio optimization is to compute resampled efficient frontier portfolios. The resampling process produces simulated returns that provide alternative inputs for a computing of efficient frontier portfolios. Resampled efficient frontier portfolios are the result of an averaging process across many possible efficient frontiers.

On the other hand, in preferred embodiments of the present invention, standard efficient frontier portfolios are used, rather than resampled efficient frontier portfolios. Among other things, an efficient frontier portfolio, in contrast to a resampled efficient frontier portfolio, can be defined as a portfolio with maximum expected return for a fixed value of risk. In many cases, it should not be appropriate to use a resampled efficient frontier. As merely one illustrative example, consider two assets with a correlation coefficient of zero, expected returns 10% and 20% and a standard deviation of returns 20%. The maximum return portfolio includes only second asset and its expected return will be 20%. The resampled portfolio, which corresponds to the maximum return point on the resampled efficient frontier, includes about 35% of the first asset and 65% of the second asset and its expected return is only about 16%.

Resampled efficient frontier portfolios are constructed by averaging many portfolios that were obtained through simulations. Therefore, in most cases, these portfolios include a large number of different assets. Among other things, there would be difficulties using such portfolios in cases where it is desirable to have an optimal portfolio with a limited number of assets from a universe.

Computing Confidence Region for the Mean-Variance Efficient Set in Some Preferred Embodiments I. Definitions and Assumptions:

In preferred embodiments, the main parameters of the mean-variance model in ITG/Opt are $\alpha$—the vector of assets expected returns and $\Sigma$—covariance matrix of the assets returns. These parameters can be estimated using historical data, analytical models, analysts' forecasts, or other methods.

V. K. Chopra, "Mean-Variance Revisited: Near-Optimal Portfolios and Sensitivity to Input Variations," Journal of Investing, 1993, the entire disclosure of which is incorporated herein by reference, illustrates, among other things, that small changes in the input parameters can result in large change in composition of the optimal portfolio. M. Best and R. Grauer, "On the Sensitivity of Mean-Variance Efficient Portfolios to Changes in Asset Means: Some Analytical and Computational Results," Review of Financial Studies, 1991, the entire disclosure of which is incorporated herein by reference, discusses, among other things, the effect of changes in the vector of assets expected returns on the mean-variance efficient frontier and the composition of optimal portfolios. V. K. Chopra and W. T. Ziemba, "The Effect of Errors in Means, Variances and Covariances on Optimal Portfolio Choice," Journal of Portfolio Management, 1993 and J. G. Kallberg and W. T. Ziemba, "Misspecification in Portfolio Selection Problems," Risk and Capital, ed. G. Bamberg and A. Spreman, Lecture Notes in Economics and Mathematical Sciences, 1984, the entire disclosures of which are incorporated herein by reference, discuss, among other things, the relative importance of errors in expected returns, specific variances and covariances of returns on the investor's utility function. The relative impact of errors in these parameters depends on the investor's risk tolerance. If risk aversion parameter is not too high, the errors in expected returns have much more significant impact on the utility function than errors in other parameters. There are two possible ways to model errors in $\alpha$:

relative error model: $r_i = \alpha_i * (1 + d * z_i)$, where $r_i$ is a real expected return of the asset i, $\alpha_i$ is an estimated expected return of the asset i, d is a standard deviation of error and $z_i$ is a normal random variables with mean 0 and standard deviation 1;

absolute error model is: $r_i = \alpha_i + d * z_i$, where $r_i$ is a real expected return of the asset i, $\alpha_i$ is an estimated expected return of the asset i, d is a standard deviation of error and $z_i$ is a normal random variables with mean 0 and standard deviation 1.

According to the CAPM model, assets with higher returns have higher risk or higher variance of returns. Therefore, the errors in estimations of expected returns should be proportional to the values of the expected return. Taking into account the last observation, we consider in the preferred embodiments the relative error model.

II. Confidence Region for the Mean-Variance Efficient Set:

First, we consider a standard portfolio optimization problem arising in the preferred embodiments:

$$\max_{h \in Q} [\alpha^T h - \gamma * Risk(h)], \quad (1)$$

where $\gamma$ is a risk aversion parameter, $\alpha$ is a vector of estimated expected returns, h is a vector of position dollars, Risk(h) is a risk function and Q is a set of feasible portfolios. If $\gamma$ is close to infinity, the problem (1) is equivalent to the problem:

$$\max_{h \in Q} [-Risk(h)]. \quad (2)$$

If $\gamma$ is close to 0, the problem (1) is equivalent to the problem:

$$\max_{h \in Q} \alpha^T h. \quad (3)$$

We denote by t a return versus risk tradeoff coefficient:

$$t = \frac{\alpha^T(h(1) - h(3))}{\alpha^T(h(2) - h(3))}, \quad (4)$$

where h(1), h(2) and h(3) are optimal solutions for problems (1), (2) and (3) correspondingly.

Now, we consider a modified optimization problem with a vector of real expected returns:

$$\max_{h \in Q} [r^T h - \gamma * Risk(h)], \quad (5)$$

where r is a vector of real expected returns. Let h(r) be an optimal portfolio for the problem (5). If the real return vector is $\alpha$, the return of this portfolio is $\alpha^T h(r)$. We find an optimal portfolio h($\alpha$) with respect to return vector $\alpha$ and with the same level of risk like h(r) has:

$$h(\alpha) = \text{Arg} \max_{(h|h \in Q \land Risk(h) == Risk(h(r)))} \alpha^T h. \quad (6)$$

The relative difference in returns of portfolios h(r) and h(α) is a function of t, d and z:

$$D(t, d, z) = \frac{\alpha^T (h(\alpha) - h(r))}{\alpha^T h(\alpha)}. \quad (7)$$

The relative difference in Risk of portfolios h(1) and h(r) is a function of γ, d and z:

$$R(t, d, z) = \frac{Risk(h(1)) - Risk(h(r))}{Risk(h(1))}. \quad (8)$$

The variable z is a normal random variable, so an expected relative return difference of portfolios h(r) and h(α) is a function of t, d:

$$\gamma(t,d) = E_z(D(t,d,z)) \quad (9)$$

An optimal portfolio, that corresponds to a high-risk aversion, is close to the minimum variance portfolio, and is much less affected by errors in the expected return vector than an optimal portfolio, that corresponds to a low risk aversion. The function δ(t,d) is equal 0 when t is 0, and it is increasing with increasing of t. Similarly, the function δ(t,d) is equal 0 when d is 0, and it is increasing with increasing of d.

We denote by $R_{up}$ an expected relative increase in Risk:

$$R_{Up}(t,d) = E_z(-R(t,d,z)|R(t,d,z)<0), \quad (10)$$

And, we denote by $R_{Down}$ an expected relative decrease in Risk:

$$R_{down}(t,d) = E_z(R(t,d,z)|R(t,d,z) \geq 0). \quad (11)$$

We let function Return(x) describe a mean-variance efficient frontier for a vector of expected returns α and a risk function Risk(h), where value Return(x) is a return of an optimal portfolio with variance x. Now, for a given point (x*, Return(x*)) on the mean-variance efficient frontier, that corresponds to a tradeoff coefficient t, and for a standard deviation d, we define a set of points Ω(t,d):

$$\Omega(t, d) = \left\{ (x, y) \middle| \begin{array}{l} x \leq x^*(1 + R_{Up}(t, d)), \\ y \geq Return(x^*(1 - R_{Down}(t, d))) * \\ (1 - \delta(t, d)), \\ y \geq Return(x) * (1 - \delta(t, d)). \end{array} \right\} \quad (12)$$

Intuitively, it will be a set of mean-variance points that deviate from the mean-variance efficient frontier not more than the most of the optimal portfolios that were obtained for different realizations of vector of expected returns.

III. Estimation of Functions δ, $R_{up}$ and $R_{Down}$:

We can, for example, estimate functions δ, $R_{Up}$ and $R_{Down}$ for all possible combinations of, e.g., 10 values of the tradeoff coefficient t with 10 values of the standard deviation of error d using Monte Carlo simulations. The results of the study can be, e.g., summarized in tables. Tables 1-3 below demonstrate some illustrative tabular results. In order to calculate, e.g., a function for specific values x and y of tradeoff and standard deviation we can find values t1 and t2 of the tradeoff and two values d1 and d2 of the standard deviation in the table such that t1 ≤ x ≤ t2 and d1 ≤ y ≤ d2.

TABLE 1

δ(t, d)

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0009 | 0.0060 | 0.0049 | 0.0076 | 0.0081 | 0.0111 | 0.0117 | 0.0129 | 0.0159 | 0.0168 | 0.0223 |
| 0.2 | 0 | 0.0063 | 0.0121 | 0.0222 | 0.0284 | 0.0301 | 0.0341 | 0.0399 | 0.0450 | 0.0500 | 0.0669 | 0.0769 |
| 0.3 | 0 | 0.0223 | 0.0299 | 0.0501 | 0.0584 | 0.0626 | 0.0616 | 0.0731 | 0.0830 | 0.0870 | 0.1061 | 0.1149 |
| 0.4 | 0 | 0.0313 | 0.0564 | 0.0828 | 0.0908 | 0.0850 | 0.0883 | 0.1012 | 0.1095 | 0.1162 | 0.1289 | 0.1339 |
| 0.5 | 0 | 0.0533 | 0.0890 | 0.1156 | 0.1124 | 0.1189 | 0.1189 | 0.1253 | 0.1421 | 0.1465 | 0.1482 | 0.1488 |
| 0.6 | 0 | 0.0702 | 0.1317 | 0.1521 | 0.1387 | 0.1443 | 0.1413 | 0.1519 | 0.1690 | 0.1746 | 0.1715 | 0.1669 |
| 0.7 | 0 | 0.0822 | 0.1686 | 0.1709 | 0.1610 | 0.1651 | 0.1652 | 0.1818 | 0.1851 | 0.1827 | 0.1818 | 0.1777 |
| 0.8 | 0 | 0.1079 | 0.1841 | 0.1917 | 0.1839 | 0.1909 | 0.1882 | 0.1958 | 0.1986 | 0.2066 | 0.2028 | 0.1975 |
| 0.9 | 0 | 0.1165 | 0.2312 | 0.2241 | 0.2130 | 0.2210 | 0.2173 | 0.2151 | 0.2200 | 0.2196 | 0.2139 | 0.2116 |
| 1 | 0 | 0.1337 | 0.2568 | 0.2453 | 0.2352 | 0.2477 | 0.2381 | 0.2436 | 0.2322 | 0.2391 | 0.2311 | 0.2281 |

TABLE 2

$R_{Up}(t, d)$

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0006 | 0.0241 | 0.0257 | 0.0383 | 0.0770 | 0.0245 | 0.0338 | 0.1565 | 0.1376 | 0.1030 | 0.054 |
| 0.2 | 0 | 0.0008 | 0.0320 | 0.0829 | 0.0921 | 0.1357 | 0.0491 | 0.0576 | 0.2209 | 0.2392 | 0.2091 | 0.116 |
| 0.3 | 0 | 0.0011 | 0.0368 | 0.1316 | 0.1831 | 0.1955 | 0.0771 | 0.0982 | 0.3479 | 0.3740 | 0.2861 | 0.162 |
| 0.4 | 0 | 0.0014 | 0.0633 | 0.2496 | 0.3143 | 0.2537 | 0.1166 | 0.1429 | 0.5006 | 0.4902 | 0.4130 | 0.24 |
| 0.5 | 0 | 0.0023 | 0.0774 | 0.3412 | 0.4422 | 0.3016 | 0.1539 | 0.1903 | 0.5502 | 0.6449 | 0.4607 | 0.297 |

TABLE 2-continued $R_{Up}(t, d)$

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0.6 | 0 | 0.0020 | 0.1120 | 0.4936 | 0.5382 | 0.3451 | 0.2075 | 0.2423 | 0.6771 | 0.7367 | 0.6053 | 0.393 |
| 0.7 | 0 | 0.0022 | 0.1812 | 0.6964 | 0.6233 | 0.3790 | 0.2419 | 0.3288 | 0.8383 | 0.8358 | 0.6330 | 0.424 |
| 0.8 | 0 | 0.0023 | 0.2569 | 0.8706 | 0.6753 | 0.4277 | 0.2824 | 0.4167 | 0.9068 | 0.8754 | 0.7830 | 0.532 |
| 0.9 | 0 | 0.0027 | 0.3305 | 0.9888 | 0.7399 | 0.4896 | 0.3213 | 0.4463 | 1.0404 | 0.9820 | 0.8205 | 0.586 |
| 1 | 0 | 0.0028 | 0.4009 | 1.1153 | 0.7796 | 0.5238 | 0.3772 | 0.5363 | 1.1867 | 1.0951 | 0.8720 | 0.68 |

TABLE 3

$R_{Down}(t, d)$

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0024 | 0.0400 | 0.0424 | 0.0393 | 0.0255 | 0.0249 | 0.0229 | 0.0274 | 0.0442 | 0.0925 | 0.2011 |
| 0.2 | 0 | 0.0024 | 0.0369 | 0.0390 | 0.0379 | 0.0309 | 0.0287 | 0.0247 | 0.0350 | 0.0880 | 0.1246 | 0.2080 |
| 0.3 | 0 | 0.0025 | 0.0314 | 0.0358 | 0.0270 | 0.0220 | 0.0204 | 0.0400 | 0.0436 | 0.0528 | 0.0979 | 0.1864 |
| 0.4 | 0 | 0.0027 | 0.0323 | 0.0339 | 0.0258 | 0.0166 | 0.0162 | 0.0336 | 0.0324 | 0.0459 | 0.0883 | 0.1612 |
| 0.5 | 0 | 0.0029 | 0.0293 | 0.0285 | 0.0235 | 0.0177 | 0.0185 | 0.0200 | 0.0147 | 0.0297 | 0.0639 | 0.1428 |
| 0.6 | 0 | 0.0027 | 0.0255 | 0.0262 | 0.0212 | 0.0154 | 0.0139 | 0.0185 | 0.0289 | 0.0351 | 0.1261 | 0.1693 |
| 0.7 | 0 | 0.0031 | 0.0189 | 0.0224 | 0.0181 | 0.0108 | 0.0112 | 0.0166 | 0.0247 | 0.0251 | 0.0520 | 0.1088 |
| 0.8 | 0 | 0.0025 | 0.0131 | 0.0181 | 0.0135 | 0.0166 | 0.0085 | 0.0135 | 0.0189 | 0.0197 | 0.0774 | 0.1265 |
| 0.9 | 0 | 0.0024 | 0.0073 | 0.0139 | 0.0104 | 0.0143 | 0.0046 | 0.0108 | 0.0127 | 0.0143 | 0.0400 | 0.0882 |
| 1 | 0 | 0.0022 | 0.0040 | 0.0085 | 0.0066 | 0.0073 | 0.0027 | 0.0058 | 0.0089 | 0.0080 | 0.0320 | 0.0744 |

IV. A Constraints Set for Confidence Region:

For a given risk aversion parameter and a standard deviation d, we can find an optimal portfolio h* for the problem (1). Now, we can compute a tradeoff coefficient t corresponding to h* and set up the following upper bound on portfolio risk:

$$\text{Risk}(h) \leq \text{Risk}(h^*)*(1+R_{Up}(t,d)). \quad (13)$$

In order to set up a lower bound on portfolio's expected return, we can solve the problem:

$$h' = \text{Arg} \max_{\{h \in Q \wedge \text{Risk}(h) == \text{Risk}(h^*)*(1-R_{Down}(t,d))\}} \alpha^T h. \quad (14)$$

Using this solution, we can set up a constraint:

$$\alpha^T h \geq \alpha^T h'^* (1-\delta(t,d)). \quad (15)$$

Computation of Sharpe Ratio in Some Preferred Embodiments

In some preferred embodiments, an optimizer is provided that can provide an optimization of a portfolio of assets based on Sharpe Ratio as a measure of goodness. Preferably, the system can provide an ex-ante maximization based on expected return and expected risk. Rather than merely using the Sharpe Ratio in an ex-post looking backward manner, preferred embodiments can provide a forward looking optimization based on the Sharpe Ratio. Thus, in some embodiments of the invention a unique form of portfolio optimization can be provided based on, e.g., the maximization of the Sharpe Ratio.

I. Definitions and Assumptions:

In preferred embodiments, the standard objective function is a maximum of a sum of the following terms multiplied by some coefficients over all portfolios h from a set Q (this set is defined by constraints imposed on the portfolio):

α(h)—the expected return of the final portfolio;

Risk(h)—the variance of return of the final portfolio (or of the difference between the final portfolio and a benchmark portfolio) divided by the basis of the portfolio;

TC(h)—the transaction cost of transition of the current portfolio into the final portfolio;

TaxCost(h)—the total tax liability after transition into the final portfolio;

Penalties(h)—the penalties for violation of some soft constraints and for realizing "almost-long-term" gains.

Preferably, in the optimal portfolio selection problem, we look for a portfolio that maximizes expected return with relatively low values of Risk, TC, TaxCost and Penalties. In that regard, we set a positive coefficient before α and negative coefficients before all other terms. We can group all terms but risk into one term, A(h), we can call it "adjusted return." This term represents a total return after accounting for all extra expenses. We can denote a coefficient before a risk term by −γ, where γ is a risk aversion parameter. This parameter can establish a trade-off between risk and return of a potential investment portfolio.

In some preferred embodiments, an alternative objective function could be the maximization of the reward-to-variability ratio S of a potential investment portfolio $h \in Q$.

$$S(h) = \frac{A(h)}{\sqrt{Risk(h)}}.$$

This ratio is known as the Sharpe ratio or Sharpe's measure. In this case, Risk is the variance of return of the final portfolio. A variance of return of the difference between the final portfolio and a benchmark portfolio is not used as Risk for the Sharpe ratio. Additionally, while in the standard objective function, the Risk is divided by portfolio basis B, one shouldn't divide Risk by B in the Sharpe ratio.

II. Finding the Sharpe Ratio in Some Preferred Embodiments:

In preferred embodiments, we maximize $S^2$ instead of S. Accordingly, we get rid of square root of the Risk in the denominator.

First, we replace $A^2$ with its piece-wise linear approximation. In that regard, we find a lower and an upper bounds on A, such that a value of A, that maximizes S, lies between these bounds.

A. Algorithm Find Bounds:

In some preferred embodiments, an algorithm find bounds is used. In preferred embodiments, the algorithm can include substantially the following:

Find an optimal solution h* for the problem: $\max_{\{h \in Q\}} A(h)$;
Set UpperBound=A(h*);
Set LowerBound=A(h*)/2;
Set S1=A(h*)/sqrt(Risk(h*));
Set flag=1;
Find an optimal solution h* for the problem: $\max_{\{h \in Q, A(h) == LowerBound\}}$Risk(h);
Set S2=A(h*)/sqrt(Risk(h*));
If (S2<S1) flag=0;
while (flag){
  LowerBound/=2.0;
  S1=S2;
  Find an optimal solution h* for the problem:
    $\max_{\{h \in Q, A(h) == LowerBound\}}$Risk(h);
  Set S2=A(h*)/sqrt(Risk(h*));
  If (S2<S1) flag=0;
  else UpperBound=LowerBound*2.0;
}

In most cases during the above algorithm, we solve an LP (linear program) three times. This algorithm terminates with values LowerBound and UpperBound for lower and upper bounds on A respectively. We define a set of links $l_1, l_2, \ldots, l_n$ to represent A and create a piece-wise linear approximation A2 for the $A^2$ where $l_1$=LowerBound and $l_n$=UpperBound. We set $l_{i+1}=l_i(1+b)$ for every i<n−1, and $l_n \leq l_{n-1}(1+b)$, and the n should be chosen to satisfy these conditions. For a given relative error value (1+e) in approximation of $A^2$ by A2, we set $$b=2(e+\sqrt{e(e+1)}).$$

If, as merely one illustrative example, e=0.0002, then error in the approximation of $A^2$ is at most 1.0002 and the final error in S is at most 1.0001. In preferred embodiments, the value of e is a user-selected variable, which can be selected, e.g., via a computer input device.

Now, we are ready to find the maximum Sharpe ratio S. We set an initial value of S to the value of S1 from the previous algorithm.

B. Algorithm Find Sharpe Ratio:

In some preferred embodiments, an algorithm find Sharpe Ratio is provided. In preferred embodiments, the algorithm can include substantially the following:

Set LastS=0
while(S−LastS>0.001){
  Find an optimal solution h* for a problem:
    X=$\max_{\{h \in Q\}}$[A2(h)−S*S*Risk(h)];
  Set LastS=S;
  Set S=sqrt(S*S+X/Risk(h*))
}

In the preferred embodiments, the algorithm outputs an optimal value of a Sharpe Ratio S and a portfolio h* that achieves this ratio. In preferred embodiments, to decrease a computation time, optimization is started in every iteration from the optimal solution obtained in the previous iteration.

III. Convergence of the Method in the Preferred Embodiments:

In the above algorithm "find bounds," we start with maximum possible value of adjusted return. In the preferred embodiments, we decrease the adjusted return by factor of two at each step of the algorithm. In the preferred embodiments, the algorithm terminates when the best value of a Sharpe Ratio, that corresponds to the current level of the adjusted return, is lower then the Sharpe Ratio at the previous iteration. In most cases, the maximum value of Sharpe Ratio is achieved with adjusted return between the maximum adjusted return and a half of the maximum adjusted return.

In the algorithm "find Sharpe Ratio," at each iteration we update our guess of the maximum Sharpe Ratio value S. We denote by $S_i$, $h_i$ and $X_i$ the values of S, h* and X correspondingly that were obtained in ith iteration of the algorithm. Since $X_i$ is a maximum of the optimization problem in the iteration i for every portfolio h, we have $$A^2(h)-S_i^2 \text{Risk}(h) \leq X_i. \quad (1)$$

If we put an optimal portfolio $h_{i+1}$, from iteration i+1 into inequality (1), we get $$\frac{A^2(h_{i+1})}{\text{Risk}(h_{i+1})} \leq S_i^2 + \frac{X_i}{\text{Risk}(h_{i+1})}. \quad (2)$$

Now, in the iteration i+1 we have:

$$A^2(h_{i+1})-S_{i+1}^2\text{Risk}(h_{i+1})=X_{i+1}, \quad (3)$$

Where $$S_{i+1}^2 = S_i^2 + \frac{X_i}{\text{Risk}(h_i)}. \quad (4)$$

Now, we substitute (4) into (3) and get:

$$\frac{A^2(h_{i+1})}{\text{Risk}(h_{i+1})} = S_i^2 + \frac{X_i}{\text{Risk}(h_i)} + \frac{X_{i+1}}{\text{Risk}(h_{i+1})}. \quad (5)$$

Finally, taking (2) and (5) together we get:

$$\frac{X_i}{\text{Risk}(h_i)} \leq \frac{X_i - X_{i+1}}{\text{Risk}(h_{i+1})}. \quad (6)$$

From the last inequality, we conclude the following properties of the algorithm:

For every iteration i of the algorithm, we have $X_i \geq X_{i+1}$.
For every iteration i of the algorithm, we have $\text{Risk}(h_i) \geq \text{Risk}(h_{i+1})$.
If $X_i/2 \leq X_{i+1}$, then $\text{Risk}(h_i)/2 \geq \text{Risk}(h_{i+1})$.

These properties illustrate that the algorithm converges at an exponential rate to the optimal value of Sharpe Ratio.

Multi-portfolio Optimization in Some Preferred Embodiments

In some preferred embodiments of the invention, the optimization system can address situations in which, for example, a portfolio manager manages portfolios for many clients, wherein the clients have different portfolios of assets. In the preferred embodiments, the system is adapted to be able to rebalance portfolios on a large scale rather than only small scale (such as, e.g., individual scale) rebalancing. For instance, the system can rebalance on a large scale without having each individual have to make certain trades individually. Notably, while individual accounts may differ, they still often may have common assets within their portfolios.

In some preferred embodiments, the system performs optimization on a smaller or individual basis (such as, e.g., on an account-by-account basis) and evaluates which results also satisfiy multi-portfolio needs. Thus, certain embodiments can, essentially, optimize individual accounts, subject to an aggregate. Based on this optimization, the system can generate results providing optimized portfolios across multiple accounts—reducing potential transaction costs, reducing the frequency of required trades and/or providing other benefits.

I. Definitions and Assumptions:

The standard optimization problem in some embodiments involves maximizing a certain objective function $\Omega(h)$ over all portfolios h from a constraint set Q that is defined by constraints imposed on the portfolio. In multi-portfolio optimization, we have K portfolios such that for every portfolio $h_k$, k=1, ..., K, there is an objective function $\Omega_k(h_k)$ and a constraint set $Q_k$. In addition, the total portfolio $\Sigma_{k=1,K} h_k$ should satisfy a constraint set Q for the total portfolio. We denote by $h_k^{Opt}$, k=1, ..., K, a portfolio that maximizes value of the objective function $\Omega_k$ such that $h_k^{Opt} \in Q_k$. Many portfolio managers have, e.g., the following multi-portfolio optimization problem: find an optimal set of K portfolios $h_1, \ldots, h_K$ such that $\Sigma_{k=1,K} h_k \in Q$ and for every portfolio $h_k$ we have $h_k \in Q_k$ and value of $\Omega_k(h_k)$ is close to the optimal value $\Omega_k(h_k^{Opt})$. In preferred embodiments, two different measures of distance between $\Omega_k(h_k)$ and $\Omega_k(h_k^{Opt})$ may be used:

relative measure: minimize value of $$\frac{\Omega_k(h_k^{Opt}) - \Omega_k(h_k)}{\Omega_k(h_k^{Opt})};$$

absolute measure: minimize value of $$\Omega_k(h_k^{Opt}) - \Omega_k(h_k).$$

In cases where a portfolio manager desires to make value of the objective function of each portfolio to be close to its maximum values in percents, the relative measure can be used. Alternatively, in cases where a portfolio manager desires to make these values to be close in dollars, the absolute measure can be used.

II. Algorithm for Multi-Portfolio Optimization:

In some preferred embodiments, an algorithm for multi-portfolio optimization can include substantially the following:

In a first preferred step of the algorithm, we find an optimal portfolio $h_k^{Opt} \in Q_k$ for every k, k=1, ..., K.

In a second preferred step of the algorithm, we distinguish between two cases:

relative measure: maximize value of scalar variable x under the following constraints $$\begin{aligned} \Omega_k(h_k) &\geq Q_k(h_k^{Opt}) * x, & \forall k \in \{1, \ldots, K\}, \\ h_k &\in Q_k, & \forall k \in \{1, \ldots, K\}, \\ \sum_{k=1}^{K} h_k &\in Q; \end{aligned}$$

absolute measure: minimize value of scalar variable y under the following constraints $$\begin{aligned} \Omega_k(h_k) + y &\geq Q_k(h_k^{Opt}), & \forall k \in \{1, \ldots, K\}, \\ h_k &\in Q_k, & \forall k \in \{1, \ldots, K\}, \\ \sum_{k=1}^{K} h_k &\in Q. \end{aligned}$$

For the relative measure case, we assume that the value of $\Omega_k(h_k^{Opt})$ is positive. Where it is negative, we minimize value of the variable x instead of maximization.

III. Optimal Solution and Solving Time:

The optimal set of portfolios $h_1, \ldots, h_K$, which is computed by the algorithm above, minimizes the value of the maximum relative or absolute distance of the value of the function $\Omega_k(h_k)$ from the value $\Omega_k(h_k^{Opt})$, where maximum is taken over all portfolios $h_1, \ldots, h_K$. This set also satisfies the constraint on the total portfolio $\Sigma_{k=1,K} h_k$. Therefore, the solution satisfies the properties required by portfolio managers in multi-portfolio optimization.

In the preferred embodiments, the time needed to solve the first step in the algorithm is substantially equal to the time of finding the optimal solution for all portfolios $h_k$, k=1, ..., K. This is to be solved even without additional constraint on the total portfolio. In the second step, one more optimization problem is to be solved. However, this should not take substantially more time than for the solution in the first step. In some embodiments, we can use the fact that the optimal solution we have in the first step is the optimal solution for the problem in the second step if the constrain on the total portfolio is relaxed. Therefore, we can first calculate a dual solution for the relaxed problem. Then, we can use this as an initial feasible solution to solve the problem dual to the problem in the second step of the algorithm. This approach can speed up finding the optimal solution in the second step of the algorithm.

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A method for optimizing a portfolio of assets, comprising:
   a) inputting portfolio data into an optimization engine, said optimization engine having a confidence region module;
   b) having said optimization engine generate optimization results via said confidence region module and outputting said results, wherein said confidence region module defines a confidence region for a mean-variance efficient set for a portfolio $P_o$ on an efficient frontier that corresponds to a risk aversion $\gamma$; and
   c) rebalancing a portfolio based on said optimization results; wherein the region includes all portfolios P, such that: $c_{low}*\text{Risk}(P_0)<\text{Risk}(P)<c_{high}*\text{Risk}(P_0)$ and $\text{Ret}(P)>c*\text{Ret}(P_{opt})$, where $P_{opt}$ is a portfolio on the efficient frontier such that $\text{Risk}(P_{opt})=\text{Risk}(P)$ and $c_{low}$, $c_{high}$ and c are relative average deviations of decrease in risk, increase in risk and expected return of optimal portfolios that correspond to the risk aversion $\gamma$ and different vectors of returns.

2. The method of claim 1, further including having a user set a specific confidence level by setting different values for constants $c_{low}$, $c_{high}$ and c.

3. The method of claim 1, further including using standard efficient frontier portfolios, wherein the standard efficient frontier portfolios involve portfolios with maximum expected return for a fixed value of risk.

4. The method of claim 1, wherein when $R_{up}$ is an expected relative increase in risk, $R_{down}$ is an expected relative decrease in risk, t is a tradeoff coefficient and d is a standard deviation, said confidence region module defines a confidence region for a mean-variance efficient set based on the equation:

$$\Omega(t,d) = \left\{(x,y) \middle| \begin{array}{l} x \leq x^*(1+R_{Up}(t,d)), \\ y \geq \text{Return}(x^*(1-R_{Down}(t,d))) * \\ (1-\delta(t,d)), \\ y \geq \text{Return}(x)*(1-\delta(t,d)). \end{array}\right.$$

5. A method for optimizing a portfolio of assets, comprising:
   a) inputting portfolio data into an optimization engine, said optimization engine having a compute Sharpe Ratio module that provides an ex-ante optimization of a portfolio of assets based on Sharpe Ratio;
   b) having said optimization engine generate optimization results and outputting said results; and
   c) rebalancing a portfolio based on said optimization results;
   wherein said compute a Sharpe Ratio module computes a Sharpe Ratio using 1) a find bounds algorithm which starts with a maximum value of adjusted return, the adjusted return is decreased by a factor at steps of the algorithm, and the algorithm terminates when a best value of Sharpe Ratio, that corresponds to a current level of the adjusted return, is lower than a Sharpe Ratio at a previous iteration and using 2) a find Sharpe Ratio algorithm in which at iterations a guess of the maximum Sharpe Ratio value S is updated;

wherein to said compute Sharpe Ratio module maximizes the reward-to-return ratio S of a potential investment portfolio $h \in Q$ $$S(h) = \frac{A(h)}{\sqrt{\text{Risk}(h)}}.$$

6. The method of claim 5, wherein $S^2$ is maximized and $A^2$ is replaced with its piece-wise linear approximation, and further including finding a lower and an upper bounds on A, such that a value of A, that maximizes S, lies between these bounds.

7. A method for multi-portfolio optimization, comprising:
   a) inputting multi-portfolio data into an optimization engine, said optimization engine having a multi-portfolio optimization module;
   b) having said optimization engine generate optimization results via said multi-portfolio optimization module and outputting said results, wherein said multi-portfolio optimization module performs an algorithm for multi-portfolio optimization that computes an optimal set of portfolios $h_1, \ldots, h_K$, that minimizes a value of a maximum relative or absolute distance of the value of a function $\Omega_k(h_k)$ from a value $\Omega_k(h_k^{Opt})$, where maximum is taken over all portfolios $h_1, \ldots, h_K$, and wherein the set also satisfies a constraint on a total portfolio $\Sigma_{k=1,K} h_k$; and
   c) rebalancing a portfolio based on said optimization results; wherein said multi-portfolio module performs the steps of: i) finding an optimal portfolio $h_k^{Opt} \in Q_k$ for every k, $k=1, \ldots, K$; and ii) distinguishing between two cases:
   a) relative measure: maximize value of scalar variable x under the following constraints $$\Omega_k(h_k) \geq \Omega_k(h_k^{Opt})*x, \quad \forall k \in \{1, \ldots, K\},$$
$$h_k \in Q_k, \quad \forall k \in \{1, \ldots, K\},$$
$$\sum_{k=1}^{K} h_k \in Q;$$

b) absolute measure: minimize value of scalar variable y under the following constraints $$\Omega_k(h_k) + y \geq \Omega_k(h_k^{Opt}), \quad \forall k \in \{1, \ldots, K\},$$
$$h_k \in Q_k, \quad \forall k \in \{1, \ldots, K\},$$
$$\sum_{k=1}^{K} h_k \in Q.$$

8. The method of claim 7, wherein an optimal solution for the first step is the optimal solution for the second step when the constraint on the portfolio is relaxed, and further including first calculating a dual solution for a relaxed problem and then using that solution as initial feasible solution to solve the problem dual to the problem in the second step.

* * * * *